(12) United States Patent
Ko et al.

(10) Patent No.: US 12,189,481 B2
(45) Date of Patent: Jan. 7, 2025

(54) METHOD OF RECOVERING BOOTLOADER IN MOBILE ELECTRONIC DEVICE AND BOOTLOADER RECOVERY SYSTEM PERFORMING THEREOF

(71) Applicant: Samsung Electronics Co., Ltd., Suwon-si (KR)

(72) Inventors: Daeman Ko, Hwaseong-si (KR); Sanguk Park, Hanam-si (KR); Sunghyun Na, Hwaseong-si (KR); Wooseok Oh, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/452,181

(22) Filed: Aug. 18, 2023

(65) Prior Publication Data

US 2023/0393943 A1    Dec. 7, 2023

Related U.S. Application Data

(63) Continuation of application No. 17/581,015, filed on Jan. 21, 2022, now abandoned.

(30) Foreign Application Priority Data

May 18, 2021  (KR) .................... 10-2021-0063802

(51) Int. Cl.
*G06F 11/14* (2006.01)
*G06F 9/4401* (2018.01)

(52) U.S. Cl.
CPC ........ *G06F 11/1417* (2013.01); *G06F 9/4401* (2013.01); *G06F 2201/82* (2013.01)

(58) Field of Classification Search
CPC ..... G06F 11/14; G06F 11/1417; G06F 9/4401
See application file for complete search history.

(56) References Cited

U.S. PATENT DOCUMENTS 9,270,339 B2 * 2/2016 Yao .................... G06F 11/20
9,606,955 B2   3/2017 Chen et al.
(Continued)

FOREIGN PATENT DOCUMENTS

JP    2006-0053607 A    2/2006
KR    100605031 B1      7/2006
(Continued)

OTHER PUBLICATIONS

Notice of Allowance dated May 23, 2023, issued in corresponding U.S. Appl. No. 17/581,015.

*Primary Examiner* — Kamini B Patel
(74) *Attorney, Agent, or Firm* — HARNESS, DICKEY & PIERCE, P.L.C.

(57) ABSTRACT

In a method of recovering a bootloader in a mobile electronic device, a bootloader recovery signal is transmitted from a bridge board to the mobile electronic device. The bridge board includes a first internal path and a second internal path. The mobile electronic device includes a third internal path and a fourth internal path. The bootloader recovery request signal is transmitted based on the first internal path and the third internal path. a boot mode of the mobile electronic device is changed based on the first internal path and the fourth internal path in response to receiving the bootloader recovery request signal. Bootloader recovery data is transmitted from a host device to the bridge board based on the changed boot mode. The bootloader recovery data is transmitted from the bridge board to the mobile electronic device based on the second internal path and the third internal path.

20 Claims, 16 Drawing Sheets

(56) References Cited

U.S. PATENT DOCUMENTS

| | | |
|---|---|---|
| 10,725,844 B2 | 7/2020 | Dougherty |
| 2004/0116119 A1* | 6/2004 | Lewis ................. H04W 12/033 |
| | | 705/40 |
| 2008/0005609 A1* | 1/2008 | Zimmer ............. G06F 11/0748 |
| | | 714/5.11 |
| 2014/0281464 A1 | 9/2014 | Le et al. |
| 2015/0277933 A1 | 10/2015 | Hsieh et al. |
| 2018/0088962 A1* | 3/2018 | Balakrishnan ...... G06F 11/0757 |
| 2018/0121277 A1 | 5/2018 | Dougherty |
| 2020/0285548 A1 | 9/2020 | Ciocari et al. |
| 2021/0149578 A1 | 5/2021 | Xu et al. |
| 2022/0308963 A1* | 9/2022 | Pathan ................ G06F 11/1469 |
| 2022/0374312 A1* | 11/2022 | Ko ...................... G06F 11/1417 |
| 2023/0401274 A1* | 12/2023 | Denninghoff ...... G06Q 30/0251 |

FOREIGN PATENT DOCUMENTS

| | | |
|---|---|---|
| KR | 10-2018-0130132 A | 12/2018 |
| KR | 101947487 B1 | 5/2019 |

* cited by examiner

METHOD OF RECOVERING BOOTLOADER IN MOBILE ELECTRONIC DEVICE AND BOOTLOADER RECOVERY SYSTEM PERFORMING THEREOF

CROSS-REFERENCE TO RELATED APPLICATION

This U.S. non-provisional application is a continuation of U.S. patent application Ser. No. 17/581,015 filed on Jan. 21, 2022, which claims priority under 35 USC § 119 to Korean Patent Application No. 10-2021-0063802, filed on May 18, 2021, in the Korean Intellectual Property Office (KIPO), the disclosures of which are incorporated by reference herein in their entireties.

BACKGROUND

1. Technical Field

Example embodiments relate generally to semiconductor integrated circuits, and more particularly to a method of recovering a bootloader in a mobile electronic device and a bootloader recovery system performing the method of recovering the bootloader.

2. Discussion of the Related Art

A bootloader included in an embedded system such as a mobile electronic device is a program for loading a kernel, checking and initializing various hardware and starting an operating system (OS). Accordingly, the bootloader may check and initialize processors, memories and/or networks included in the mobile electronic device, and when an error occurs in the OS, the bootloader performs a recovery operation on the OS such that the electronic device can self-recovering the OS.

When an error occurs in the bootloader, the mobile electronic device cannot recover the bootloader by itself. In general, a user of the mobile electronic device disassembles the mobile electronic device, changes a boot mode of the electronic device, and re-installs an original bootloader.

SUMMARY

Some example embodiments may provide a method and a system for a mobile electronic device, capable of recovering a bootloader and improving an efficiency of a development process.

According to example embodiments, in a method of recovering a bootloader in a mobile electronic device, a bootloader recovery signal is transmitted from a bridge board to the mobile electronic device. The bridge board includes a first internal path and a second internal path. The mobile electronic device includes a third internal path and a fourth internal path. The bootloader recovery request signal is transmitted based on the first internal path and the third internal path. A boot mode of the mobile electronic device is changed based on the first internal path and the fourth internal path in response to receiving the bootloader recovery request signal. Bootloader recovery data is transmitted from a host device to the bridge board based on the changed boot mode. The bootloader recovery data is transmitted from the bridge board to the mobile electronic device based on the second internal path and the third internal path.

According to example embodiments, a bootloader recovery system includes a bridge board, a mobile electronic device and a host device. The bridge board includes a first processor, first and second internal paths and a first internal path selector. The first internal path selector selects one of the first and second internal paths under a control of the first processor. The mobile electronic device electrically connected to the bridge board, and includes a second processor, third and fourth internal paths and a second internal path selector. The second internal path selector selects one of the third and fourth internal paths under a control of the second processor. The host device electrically connected to the mobile electronic device. The bridge board transmits a bootloader recovery request signal to the mobile electronic device based on the first internal path and the third internal path. The mobile electronic device changes a boot mode based on the first internal path and the fourth internal path in response to receiving the bootloader recovery request signal. The host device transmits bootloader recovery data to the bridge board based on the changed boot mode. The bridge board transmits the bootloader recovery data to the mobile electronic device based on the second internal path and the third internal path.

According to example embodiments, in a method of recovering a bootloader in a mobile electronic device, a bootloader recovery signal is transmitted from a bridge board to the mobile electronic device. The bridge board includes a first internal path and a second internal path. The mobile electronic device includes a third internal path and a fourth internal path. The bootloader recovery request signal is transmitted based on the first internal path and the third internal path. A boot mode of the mobile electronic device is changed based on the first internal path and the fourth internal path in response to receiving the bootloader recovery request signal. Bootloader recovery data is transmitted from a host device to the bridge board based on the changed boot mode. The bootloader recovery data is transmitted from the bridge board to the mobile electronic device based on the second internal path and the third internal path. The bootloader is recovered based on the bootloader recovery data. The bridge board includes a first connector, the mobile electronic device includes a second connector, and the bridge board and the mobile electronic device are connected to each other through the first connector and the second connector. Each of the first connector and the second connector includes a first pin and a second pin. The bootloader recovery request signal is generated by setting a voltage level of the first pin and the second pin to a logic high level.

BRIEF DESCRIPTION OF THE DRAWINGS

Example embodiments of the present disclosure will be more clearly understood from the following detailed description taken in conjunction with the accompanying drawings.

DETAILED DESCRIPTION OF EXAMPLE EMBODIMENTS

Figure 1:
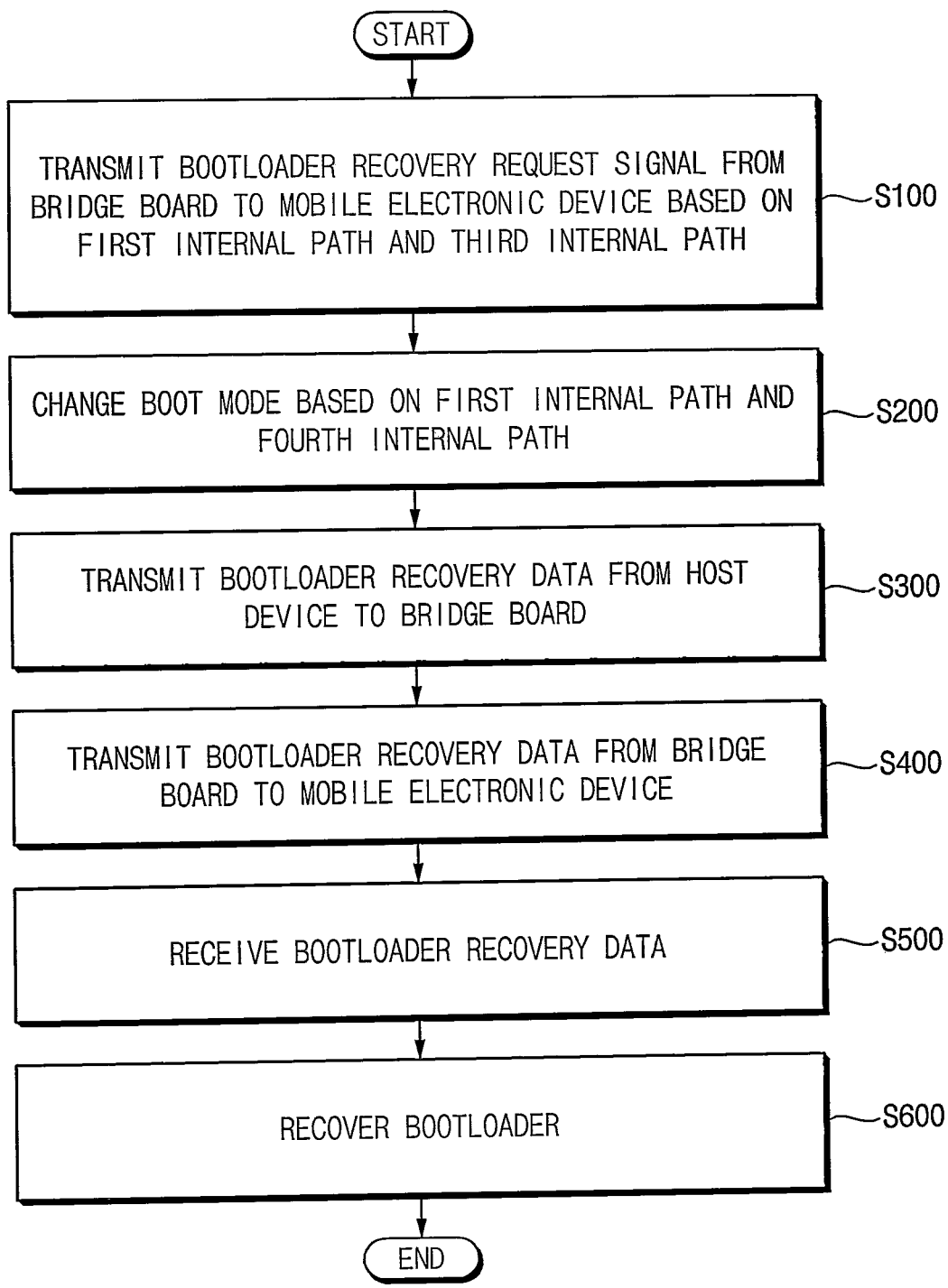
FIG. 1 is a flowchart illustrating a method of recovering a bootloader in a mobile electronic device according to example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a flowchart illustrating a method of recovering a bootloader in a mobile electronic device according to example embodiments.

Referring to FIG. 1, a method of recovering a bootloader in a mobile electronic device according to example embodiments may be performed by a bootloader recovery system in which a bridge board is electrically connected between the mobile electronic device and a host device.

When the mobile electronic device is powered on by a user, the mobile electronic device may perform a booting process of executing a series of operations starting with a kernel initialization.

The booting process may be performed by the bootloader. The bootloader may load an operating system (OS) and data stored in a storage device into an internal memory, and call an 'initialization process'. The initialization process may initialize the mobile electronic device and execute various daemons, a context manager, a media server and Zygote, and the like required for operations of frameworks.

However, when an error occurs in the bootloader, the booting process cannot be performed normally. Accordingly, in the method of recovering the bootloader in the mobile electronic device, the bootloader may be recovered by targeting the mobile electronic device in which the booting process is not normally performed due to an error in the bootloader. Detailed components included in the bootloader recovery system will be described later with reference to FIGS. 2 and 3.

In the method of recovering the bootloader in the mobile electronic device, the bridge board may include a first internal path and a second internal path, the mobile electronic device may include a third internal path and a fourth internal path, and a bootloader recovery request signal may be transmitted from the bridge board to the mobile electronic device based on the first internal path and the third internal path (S100).

In some example embodiments, the first internal path and the fourth internal path may operate based on a first communication scheme, and the second internal path and the third internal path may operate based on a second communication scheme different from the first communication scheme.

In some example embodiments, the first communication scheme may be based on an universal asynchronous receiver transmitter (UART) communication standard, and the second communication scheme may be based on an universal serial bus (USB) communication standard.

In some example embodiments, the bootloader recovery request signal may be a signal requesting to change an order of devices used during a default booting. The default booting may represent a process of loading the bootloader from devices included in the mobile electronic device according to a predetermined or alternatively, desired order when the mobile electronic device is powered on. For example, the default booting may be configured to search for the bootloader from the storage device, and then to search for the bootloader from a USB device when the bootloader is not searched from the storage device. When the bootloader is searched, the bootloader may be loaded from the searched device.

In response to receiving the bootloader recovery request signal, e.g., when the bootloader recovery request signal is received, a boot mode of the mobile electronic device may be changed based on the first internal path and the fourth internal path (S200).

In some example embodiments, when the boot mode is changed, the order of devices referenced according to the default booting may be changed. For example, when the boot mode is changed, the bootloader may be searched directly from the USB device without searching the storage device.

Bootloader recovery data may be transmitted from the host device to the bridge board based on the changed boot mode (S300). The bootloader recovery data may be transmitted from the bridge board to the mobile electronic device based on the second internal path and the third internal path (S400).

In some example embodiments, the host device may store a bootloader that does not have an error. The host device may transmit the bootloader as the bootloader recovery data to the bridge board.

The mobile electronic device may receive the bootloader recovery data based on the third internal path (S500). The bootloader of the mobile electronic device may be recovered based on the bootloader recovery data (S600).

In some example embodiments, the bootloader with the error stored in the mobile electronic device may be replaced with the bootloader recovery data, and the bootloader recovery data may operate as a new bootloader.

Recently, since waterproof and/or dustproof capabilities of the mobile electronic device may be considered important, once the mobile electronic device is disassembled, it may not be guaranteed whether the waterproof and/or dustproof capabilities of the mobile electronic device may be maintained even when the mobile electronic device is reassembled. When the mobile electronic device is disassembled whenever debugging is required due to an error in the bootloader during a development process of the mobile electronic device, a redundant or unnecessary process is repeated several times, which may reduce efficiency of the development process.

As described above, in the method of recovering the bootloader in the mobile electronic device according to example embodiments, the bootloader having an error may be recovered without disassembling the mobile electronic device. Accordingly, when the method of recovering the bootloader is executed, the efficiency of the development process may be improved without deteriorating the waterproof and/or dustproof capabilities of the mobile electronic device.

Figure 2:
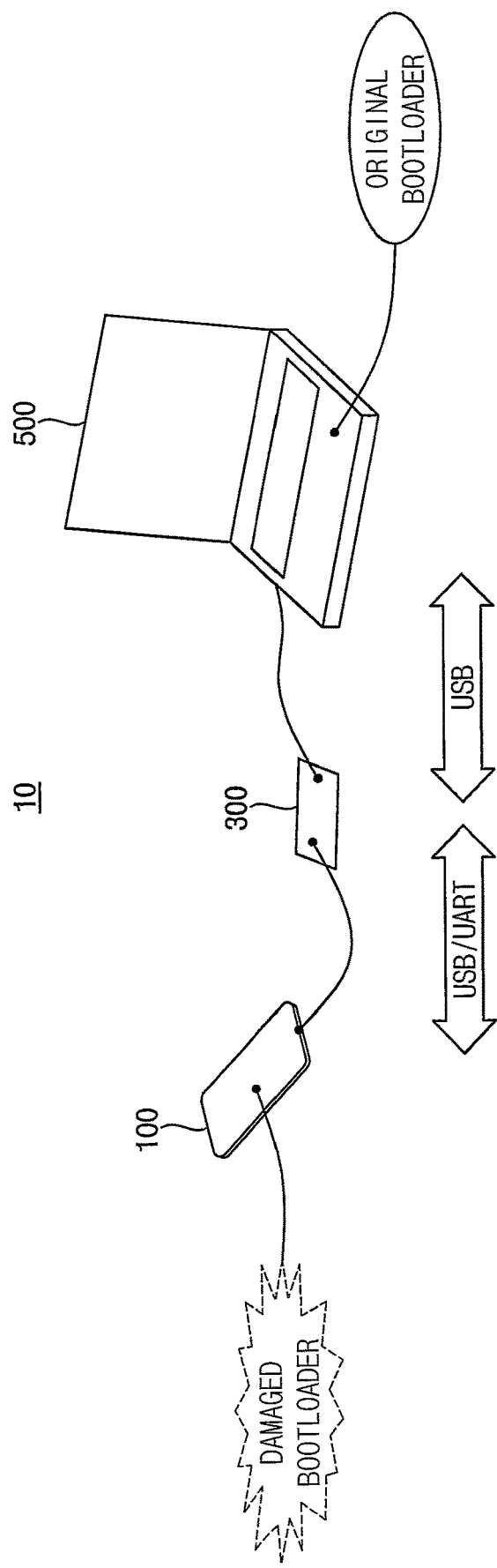
FIG. 2 is a diagram illustrating a bootloader recovery system according to example embodiments.
Figure 3:
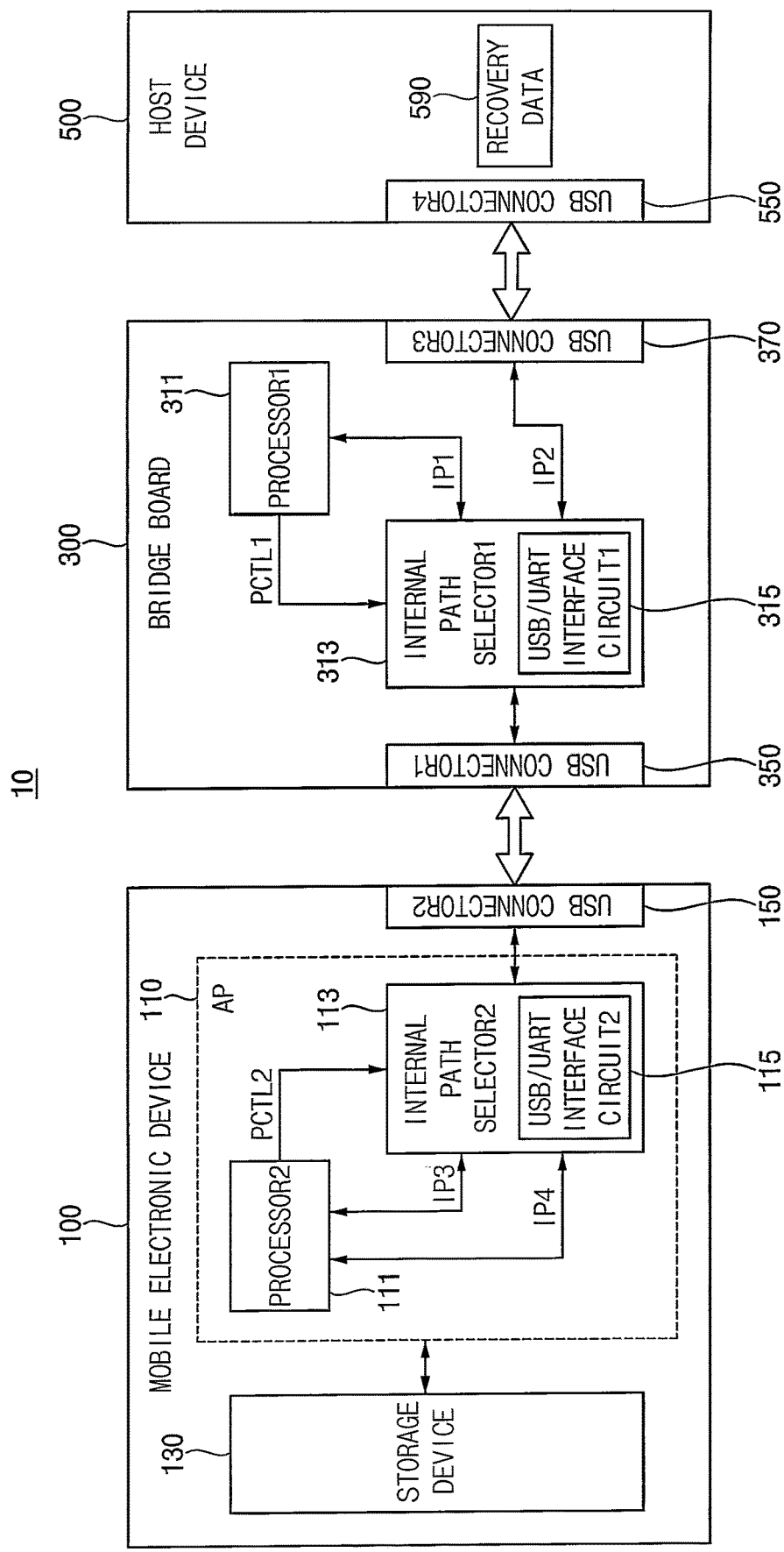
FIG. 3 is a block diagram illustrating example embodiments of the bootloader recovery system of FIG. 2.

FIG. 2 is a diagram illustrating a bootloader recovery system according to example embodiments. FIG. 3 is a block diagram illustrating example embodiments of the bootloader recovery system of FIG. 2.

Referring to FIGS. 2 and 3, a bootloader recovery system 10 may include a mobile electronic device 100, a bridge board 300 and a host device 500. The bridge board 300 may be electrically connected between the mobile electronic device 100 and the host device 500.

In some example embodiments, the bridge board 300 and the mobile electronic device 100 may communicate with each other based on a first communication scheme and a second communication scheme, and the bridge board 300 and the host device 500 may communicate with each other based on the second communication scheme.

As described above with reference to FIG. 1, the first communication scheme may be based on the UART communication standard, and the second communication scheme may be based on the USB communication standard.

A bootloader having an error, e.g., a damaged bootloader, may be stored in the mobile electronic device 100, and a bootloader not having an error, e.g., an original bootloader may be stored in the host device 500.

The bridge board 300 may include a first processor 311, a first internal path selector 313, a first connector 350 and/or a third connector 370. The first internal path selector 313 may include a first interface circuit 315. The first processor 311 may control overall operations of the components 313, 315, 350 and 370 included in the bridge board 300.

In some example embodiments, the first processor 311 may include a micro controller unit (MCU), may generate a first control signal PCTL1 and may transmit the first control signal PCTL1 to the first internal path selector 313. The first processor 311 may control the first internal path selector 313 based on the first control signal PCTL1.

In some example embodiments, the first processor 311 may control the first internal path selector 313 such that the first connector 350 and the first processor 311 are connected by the first internal path IP1 or the first connector 350 and the third connector 370 are connected by the second internal path IP2. For example, the first processor 311 may generate the bootloader recovery request signal described above with reference to FIG. 1, and the bootloader recovery request signal may be transmitted from the bridge board 300 to the mobile electronic device 100 when the first connector 350 and the first processor 311 are connected through the first internal path IP1. For example, the host device 500 may store bootloader recovery data 590, and the bootloader recovery data 590 may be transmitted from the host device 500 to the mobile electronic device 100 when the first connector 350 and the third connector 370 are connected through the second internal path IP2.

The mobile electronic device 100 may include an application processor (AP) 110, a storage device 130 and/or a second connector 150. The application processor 110 may include a second processor 111 and/or a second internal path selector 113. The second internal path selector 113 may include a second interface circuit 115. The second processor 111 may control overall operations of the components 113, 115, 130 and 150 included in the mobile electronic device 100.

In some example embodiments, the second processor 111 may include a central processing unit (CPU), and the second processor 111 may generate a second control signal PCTL2 and may transmit the second control signal PCTL2 to the second internal path selector 113. The second processor 111 may control the second internal path selector 113 based on the second control signal PCTL2.

In some example embodiments, the second processor 111 may control the second internal path selector 113 such that the second connector 150 and the second processor 111 are connected by the third internal path IP3 or the second connector 150 and the second processor 111 are connected by the fourth internal path IP4. For example, the second processor 111 may receive the bootloader recovery request signal described above with reference to FIG. 1, and the bootloader recovery request signal may be received by the mobile electronic device 100 when the second connector 150 and the second processor 111 are connected through the third internal path IP3. For example, the second processor 111 may change the boot mode described above with reference to FIG. 1, and the boot mode may be changed when the second connector 150 and the second processor are connected through the fourth internal path IP4. For example, the second processor 111 may receive the bootloader recovery data 590, and the bootloader recovery data 590 is received by the mobile electronic device 100 when the second connector 150 and the second processor are connected through the third internal path IP3.

The storage device 130 may store the damaged bootloader, and when the original bootloader stored in the host device 500 is transmitted to the mobile electronic device 100 as bootloader recovery data 590, the storage device 130 may replace the damaged bootloader with the bootloader recovery data 590 to store the bootloader recovery data 590.

The host device 500 may include a fourth connector 550.

In some example embodiments, the mobile electronic device 100 and the bridge board 300 may connected through the first connector 350 and the second connector 150, and the bridge board 300 and the host device 500 may connected through the third connector 370 and the fourth connector 550.

In some example embodiments, the first connector 350, the second connector 150, the third connector 370 and the fourth connector 550 may be connectors for basically performing the second communication scheme. For example, each of the first to fourth connectors 150, 350, 370 and 550 may be a USB connector. However, as will be described later, interface circuits for performing the first communication scheme may be connected to data pins among a plurality of pins included in each of the first and second connectors 150 and 350, and thus the first and second connectors 150 and 350 may be diverted to perform the first communication scheme other than the second communication scheme.

Figure 4:
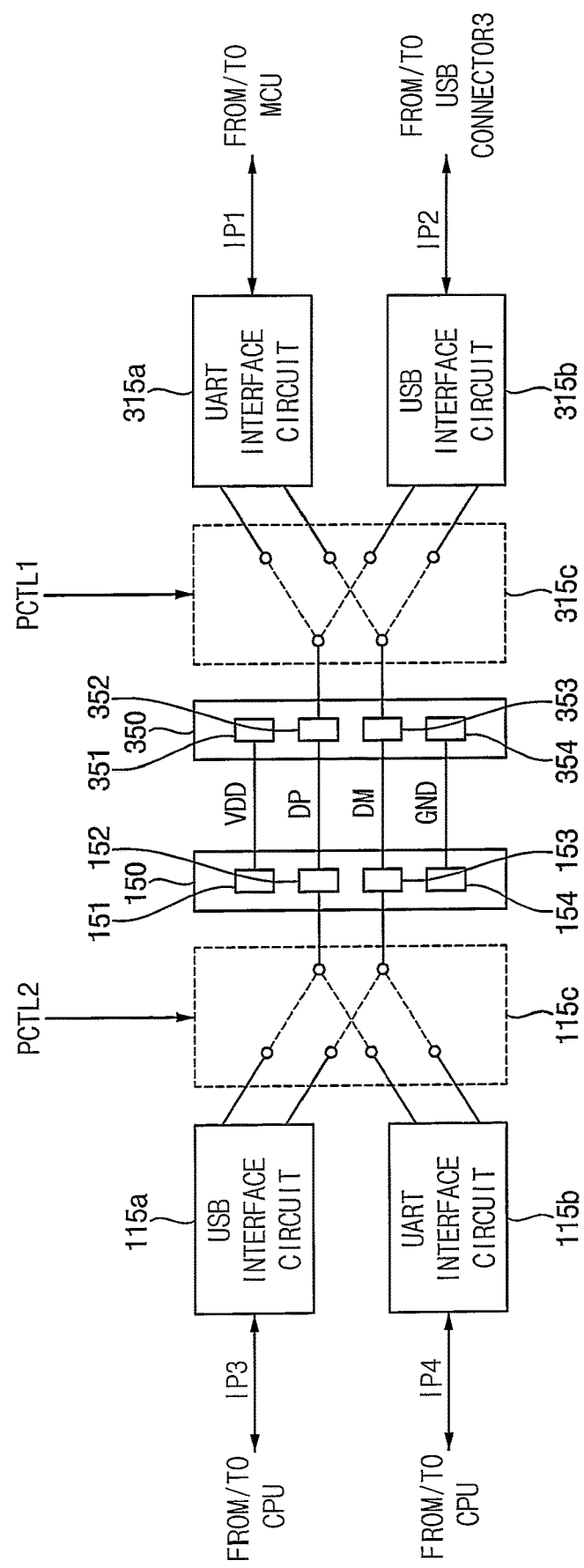
FIG. 4 is a block diagram illustrating example embodiments of the first and second connectors and the first and second internal path selectors in FIG. 3.

FIG. 4 is a block diagram illustrating example embodiments of the first and second connectors and the first and second internal path selectors in FIG. 3.

Referring to FIGS. 3 and 4, the first internal path selector 313 may include the first interface circuit 315, and the second internal path selector 113 may include the second interface circuit 115. The first interface circuit 315 may include a first communication interface circuit 315a, a second communication interface circuit 315b and a first path selection circuit 315c. The second interface circuit 115 may include a third communication interface circuit 115a, a fourth communication interface circuit 115b and a second path selection circuit 115c. Each of the first connector 350 and the second connector 150 may include a plurality of pins.

In some example embodiments, the first connector 350 may include first to fourth pins 351, 352, 353 and 354, and the second connector 150 may include fifth to eighth pins 151, 152, 153 and 154.

In some example embodiments, the first to fourth pins 351, 352, 353 and 354 and the fifth to eighth pins 151, 152, 153 and 154 may be electrically connected to each other. For example, the first pin 351 and the fifth pin 151 may be connected to each other. The second pin 352 and the sixth pin 152 may be connected to each other. The third pin 353 and the seventh pin 153 may be connected to each other. The fourth pin 354 and the eighth pin 154 may be connected to each other.

In some example embodiments, each of the second pin 352, the third pin 353, the sixth pin 152 and the seventh pin 153 may be a data pin. For example, data including arbitrary information may be transmitted in a form of a differential signal from the second and third pins 352 and 353 to the sixth and seventh pins 152 and 153 or in the opposite direction.

In some example embodiments, the second and third pins 352 and 353 may be connected to one of the first communication interface circuit 315a and the second communication interface circuit 315b, and the sixth and seventh pins 152 and 153 may be connected to one of the third communication interface circuit 115a and the fourth communication interface circuit 115b.

In some example embodiments, the first path selection circuit 315c may receive the first control signal PCTL1 and may connect the second and third pins 352 and 353 with one of the first communication interface circuit 315a and the second communication interface circuit 315b, based on the first control signal PCTL1. The second path selection circuit 115c may receive the second control signal PCTL2 and may connect the sixth and seventh pins 152 and 153 with one of the third communication interface circuit 115a and the fourth communication interface circuit 115b, based on the second control signal PCTL2.

In some example embodiments, the first communication interface circuit 315a may be disposed between the first internal path IP1 and the second and third pins 352 and 353, and the second communication interface circuit 315b may be disposed between the second internal path IP2 and the second and third pins 352 and 353. The third communication interface circuit 115a may be disposed between the third internal path IP3 and the sixth and seventh pins 152 and 153. The fourth communication interface circuit 115b may be disposed between the fourth internal path IP4 and the sixth and seventh pins 152 and 153.

Although not illustrated in detail, the first and fifth pins 351 and 151 may be connected to a power supply voltage VDD, and the fourth and eighth pins 354 and 154 may be connected to a ground voltage GND.

Based on the configuration illustrated in FIG. 4, signals and/or data may be exchanged between the first processor 311 and the second processor 111 illustrated in FIG. 3, and may also be exchanged between the mobile electronic device 100, the bridge board 300 and the host device 500.

In some example embodiments, the first communication scheme described above with reference to FIG. 1 may be performed by the first communication interface circuit 315a and the fourth communication interface circuit 115b. The second communication scheme described above with reference to FIG. 1 may be performed by the second communication interface circuit 315b and the third communication interface circuit 115a.

In some example embodiments, the first communication interface circuit 315a may correspond to the first internal path IP1, the second communication interface circuit 315b may correspond to the second internal path IP2, the third communication interface circuit 115a may correspond to the third internal path IP3 and the fourth communication interface circuit 115b may correspond to the fourth internal path IP4. Accordingly, the first communication scheme may be performed by the first internal path IP1 and the fourth internal path IP4. The second communication scheme may be performed by the second internal path IP2 and the third internal path IP3.

Figure 5:
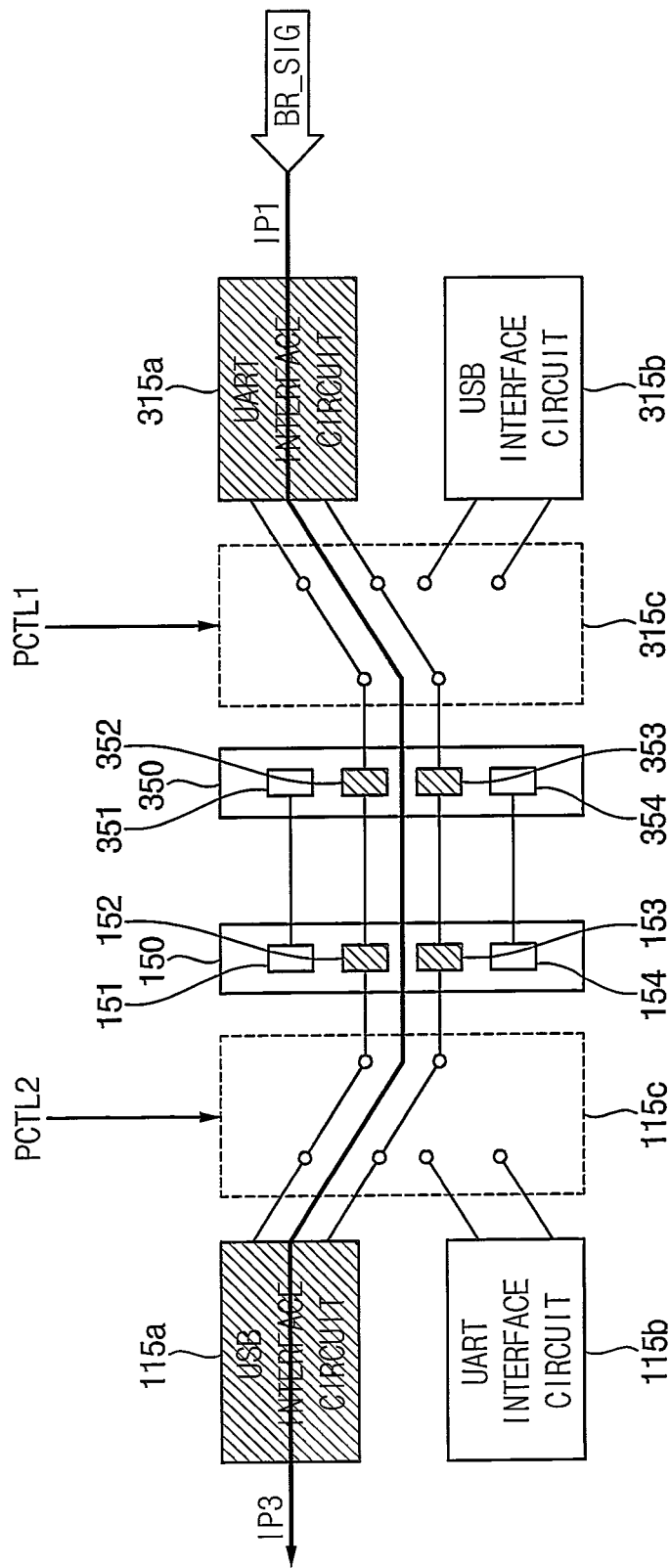
FIG. 5 is a diagram for describing a process of transmitting the bootloader recovery request signal in FIG. 1.

FIG. 5 is a diagram for describing a process of transmitting the bootloader recovery request signal in FIG. 1.

Referring to FIGS. 1, 2, 3 and 5, when the method of recovering the bootloader according to example embodiments is performed by the bootloader recovery system 10, a bootloader recovery request signal BR_SIG may correspond to a signal initially transmitted between the mobile electronic device 100, the bridge board 300 and the host device 500 included in the bootloader recovery system 10. That is, the method of recovering the bootloader according to example embodiments may be started by the bootloader recovery request signal BR_SIG.

In some example embodiments, when the mobile electronic device 100 and the bridge board 300 are electrically connected to each other, the bridge board 300 may generate the bootloader recovery request signal BR_SIG and transmit the bootloader recovery request signal BR_SIG to the mobile electronic device 100 or the first processor 311.

In some example embodiments, the bridge board 300 may set a voltage level of each of the second and third pins 352 and 353 to a predetermined or alternatively, desired voltage level to generate the bootloader recovery request signal BR_SIG.

In some example embodiments, in a process of transmitting the bootloader recovery request signal BR_SIG, the first path selection circuit 315c may connect the second and third pins 352 and 353 of the first connector 350 with the first communication interface circuit 315a, and the second path selection circuit 115c may connect the sixth and seventh pins 152 and 153 of the second connector 150 with the third communication interface circuit 115a. Accordingly, the bootloader recovery request signal BR_SIG may be transmitted from the bridge board 300 to the mobile electronic device 100 through the first internal path IP1, the first communication interface circuit 315a, the third communication interface circuit 115a and the third internal path IP3 sequentially.

In some example embodiments, since the bootloader recovery request signal BR_SIG is transmitted through the third communication interface circuit 115a included in the mobile electronic device 100, the bootloader recovery request signal BR_SIG may be interpreted according to the second communication scheme performed by the third communication interface circuit 115a. As described above with reference to FIGS. 2 and 3, the second communication scheme may be based on the USB communication standard. Hereinafter, the bootloader recovery request signal BR_SIG will be described.

Figure 6:
FIG. 6 is a diagram for describing a bootloader recovery request signal in FIG. 1.

FIG. 6 is a diagram for describing a bootloader recovery request signal in FIG. 5.

Referring to FIGS. 5 and 6, the bootloader recovery request signal BR_SIG may be generated based on one of a plurality of bus states according to the second communication scheme, e.g., USB communication.

In some example embodiments, the plurality of bus states may include first to fourth bus states D1, D0, SE0 and SE1. The first bus state D1 may set a voltage level of a first data signal DP to a logic high level and a voltage level of a second data signal DM to a logic low level to represent a digital differential signal '1'. The second bus state D0 may set the voltage level of the first data signal DP to the logic low level and the voltage level of the second data signal DM to the logic high level to represent a digital differential signal '0'. The third bus state SE0 (single-ended zero) may set the voltage levels of the first data signal DP and the second data signal DM to be equal to or less than a first threshold voltage level for more than a predetermined or alternatively, desired time to represent a disconnected state. The fourth bus state SE1 (single-ended one) may set the voltage levels of the first data signal DP and the second data signal DM to be equal to or higher than a second threshold voltage level different from the first threshold voltage level to represent an illegal state.

In some example embodiments, the fourth bus state SE1 may be a bus state that is not used for data communication between devices when the second communication scheme is used for a general purpose. Accordingly, the fourth bus state SE1 may be used as the bootloader recovery request signal BR_SIG representing the start of the method of recovering the bootloader in the mobile electronic device according to example embodiments.

In some example embodiments, the first data signal DP may correspond to the second pin 352 of the first connector 350, and the second data signal DM may correspond to the third pin 353 of the first connector 350. Accordingly, the bridge board 300 may set voltage levels of the second and third pins 352 and 353 to the logic high levels to generate the bootloader recovery request signal BR_SIG.

Figure 7:
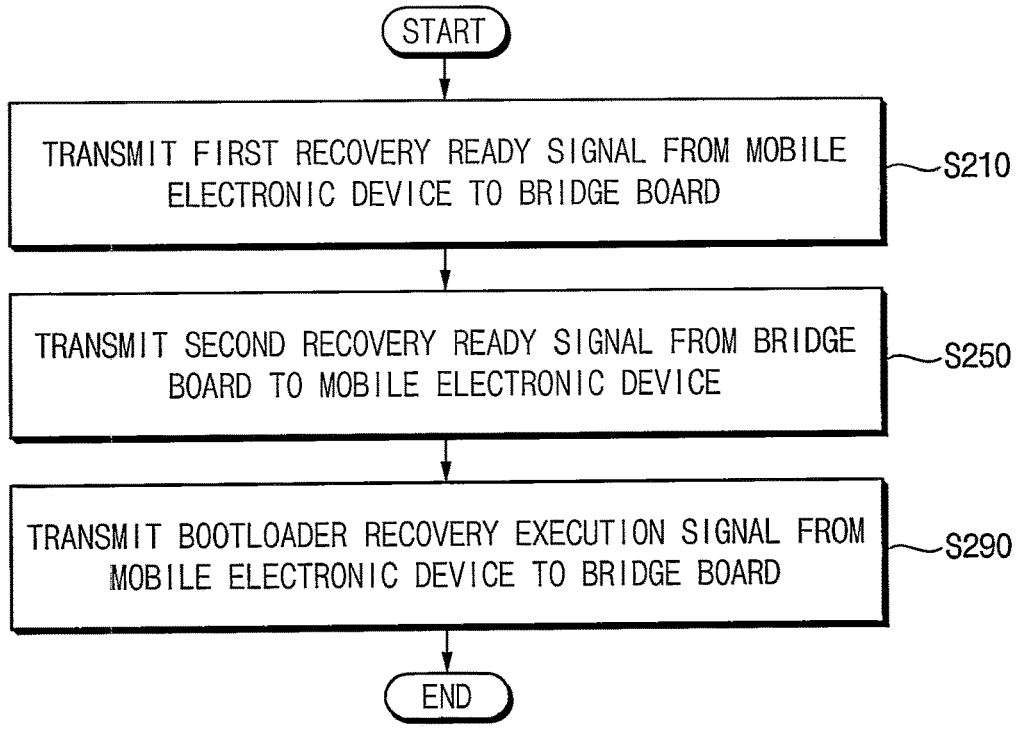
FIG. 7 is a flowchart illustrating example embodiments of changing the boot mode of the mobile electronic device in FIG. 1.

FIG. 7 is a flowchart illustrating example embodiments of changing the boot mode of the mobile electronic device in FIG. 1.

Referring to FIGS. 1 and 7, when changing the boot mode of the mobile electronic device (S200), a first recovery ready signal may be transmitted from the mobile electronic device to the bridge board based on a first internal path and a fourth internal path (S210).

A second recovery ready signal may be transmitted from the bridge board to the mobile electronic device based on the first internal path and the fourth internal path (S250).

A bootloader recovery execution signal may be transmitted from the mobile electronic device to the bridge board based on the first internal path and the fourth internal path (S290).

In some example embodiments, as described above with reference to FIG. 4, the first communication scheme described above with reference to FIG. 1 may be performed by the first internal path and the fourth internal path. Accordingly, the first recovery ready signal, the second recovery ready signal and the bootloader recovery execution signal may be transmitted based on the first communication scheme.

In some example embodiments, the first recovery ready signal may include a string "se1d" as payload data, the second recovery ready signal may include a string "se1r" as the payload data, and the bootloader recovery execution signal may include a string "go" as the payload data.

In some example embodiments, when the first communication scheme corresponds to the UART communication, the mobile electronic device and the bridge board may transmit and receive the first recovery ready signal, the second recovery ready signal and the bootloader recovery execution signal based on the UART communication.

Figure 8:
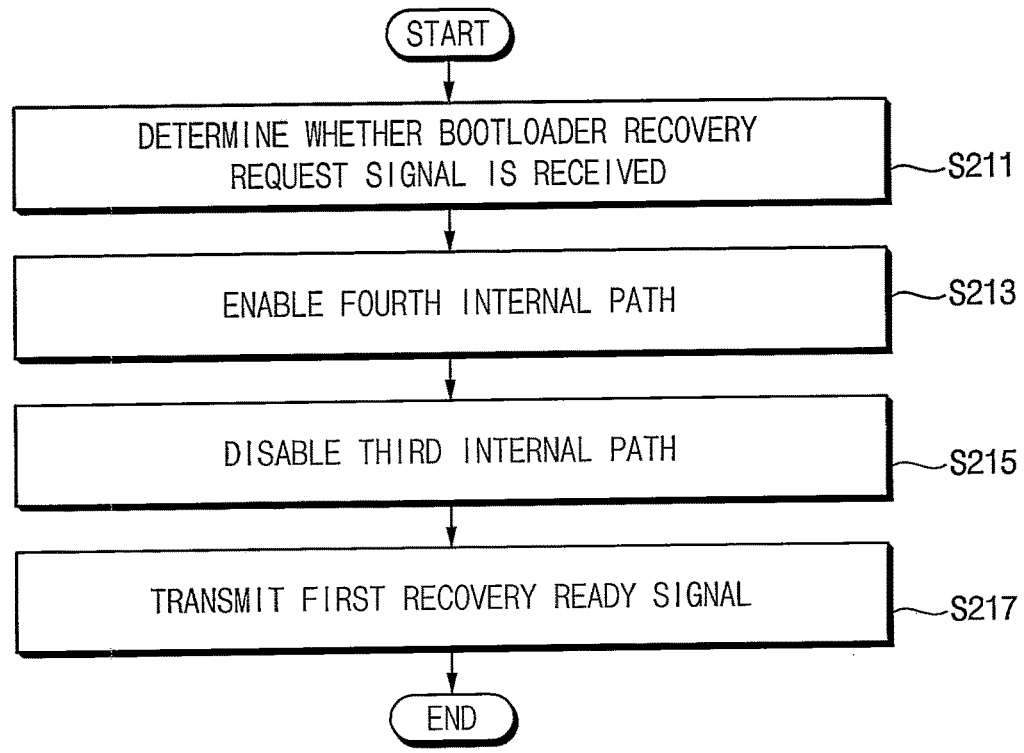
FIG. 8 is a flowchart illustrating example embodiments of transmitting the first recovery ready signal in FIG. 7.

FIG. 8 is a flowchart illustrating example embodiments of transmitting the first recovery ready signal in FIG. 7.

Referring to FIGS. 1, 2, 3, 7 and 8, the operation of transmitting the first recovery ready signal may be performed by the mobile electronic device 100.

When transmitting the first recovery ready signal (S210), it may be determined whether the bootloader recovery request signal is received (S211).

In some example embodiments, the mobile electronic device 100 may determine whether the bootloader recovery request signal is received based on the voltage level of each of the sixth and seventh pins 152 and 153 included in the second connector 150. For example, when the voltage level of each of the sixth pin 152 connected to the second pin 352 of the first connector 350 and the seventh pin 153 connected to the third pin 353 of the first connector 350 correspond to the logic high level, it may be determined that the bootloader recovery request signal is received.

In response to receiving the bootloader recovery request signal, e.g., when the bootloader recovery request signal is received, the fourth internal path IP4 of the mobile electronic device 100 may be enabled to communicate with the bridge board 300 based on the first communication scheme (S213). In response to receiving the bootloader recovery request signal, e.g., the bootloader recovery request signal is received, the third internal path IP3 of the mobile electronic device 100 may be disabled (S217).

The first recovery ready signal may be transmitted from the mobile electronic device 100 to the bridge board 300 based on the first internal path IP1 and the fourth internal path IP4 (S217).

In some example embodiments, the second path selection circuit 115*c* may connect the sixth and seventh pins 152 and 153 to the fourth communication interface circuit 115*b* based on the second control signal PCTL2 to enable the fourth internal path IP4 and disable the third internal path IP3.

Figure 9:
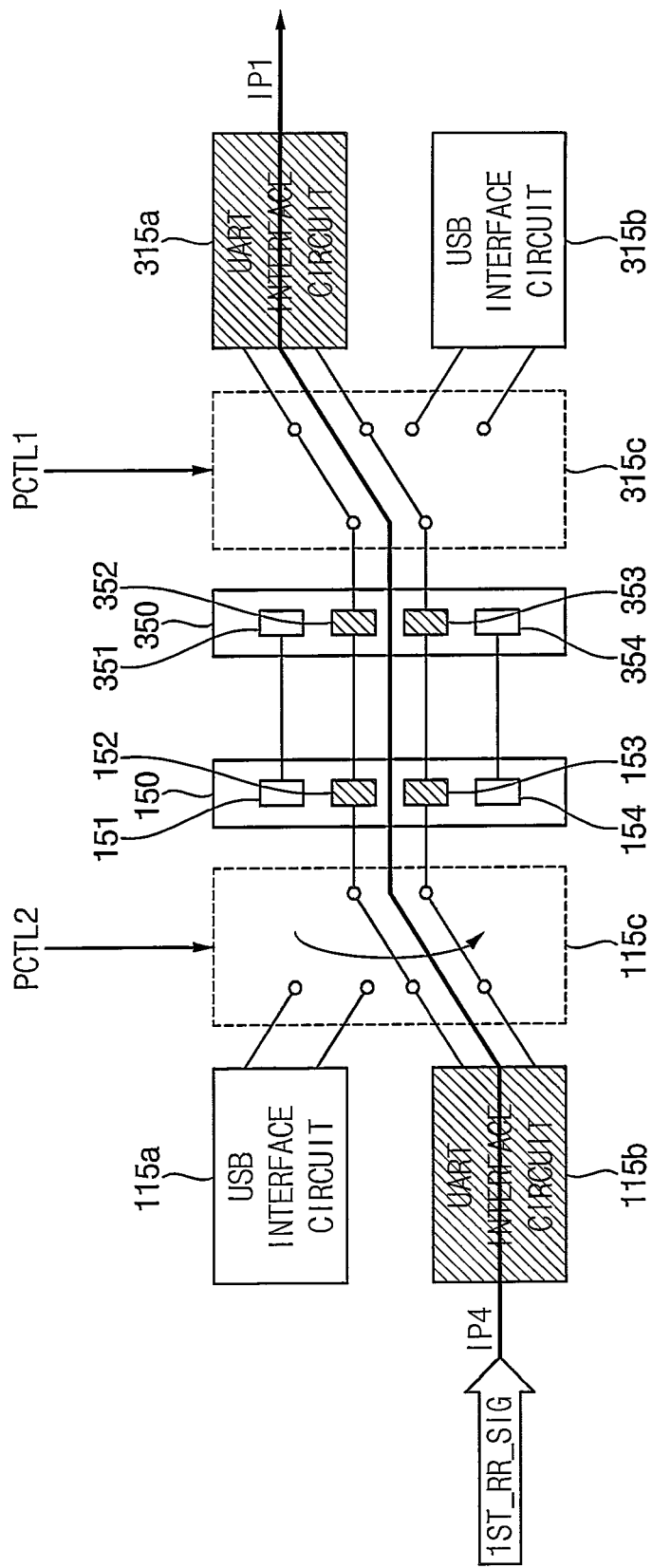
FIG. 9 is a diagram for describing a process of transmitting the first recovery ready signal in FIG. 7.

FIG. 9 is a diagram for describing a process of transmitting the first recovery ready signal in FIG. 7.

Referring to FIGS. 1, 2, 3, 7 and 9, in transmitting the first recovery ready signal 1ST_RR_SIG, the first path selection circuit 315*c* may connect the second and third pins 352 and 353 of the first connector 350 with the first communication interface circuit 315*a*, and the second path selection circuit 115*c* may connect the sixth and seventh pins 152 and 153 of the second connector 150 with the fourth communication interface circuit 115*b*.

Accordingly, the first recovery ready signal 1ST_RR_SIG may be transmitted from the mobile electronic device 100 to the bridge board 300 through the fourth internal path IP4, the fourth communication interface circuit 115*b*, the first communication interface circuit 315*a* and the first internal path IP1 sequentially.

In some example embodiments, since the first recovery ready signal 1ST_RR_SIG is transmitted through the first communication interface circuit 315*a*, the first recovery ready signal 1ST_RR_SIG may be interpreted according to the first communication scheme performed by the first communication interface circuit 315*a*. As described above with reference to FIGS. 2 and 3, the first communication scheme may be based on the UART communication standard.

Figure 10:
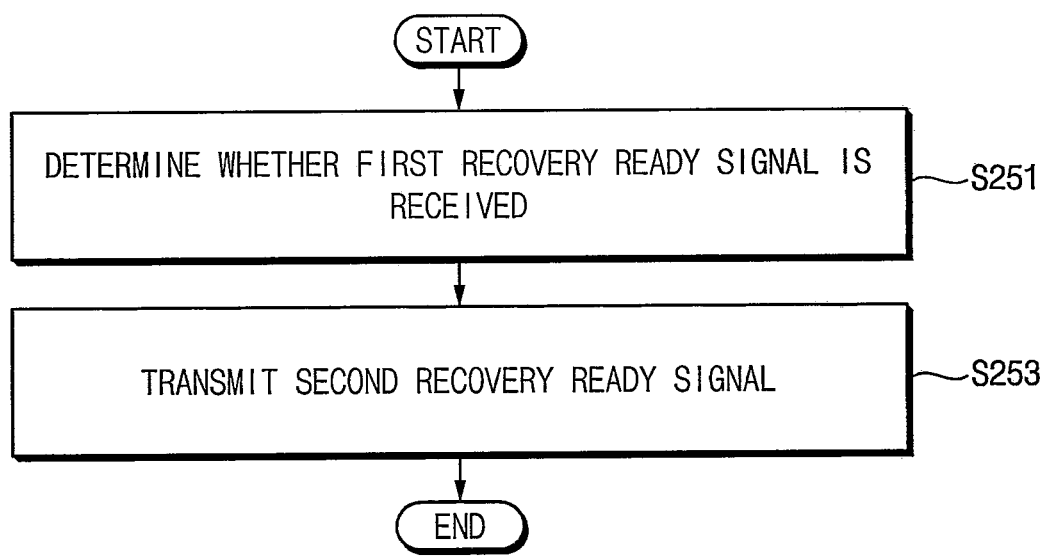
FIG. 10 is a flowchart illustrating example embodiments of transmitting the second recovery ready signal in FIG. 7.

FIG. 10 is a flowchart illustrating example embodiments of transmitting the second recovery ready signal in FIG. 7.

Referring to FIGS. 1, 2, 3, 7 and 10, transmitting the second recovery ready signal may be performed by the bridge board 300.

In the transmitting the second recovery ready signal, it may be determined whether the first recovery ready signal is received (S251).

In some example embodiments, the bridge board 300 may interpret payload data included in signal received from the mobile electronic device 100 to determine whether the first recovery ready signal is received. For example, when the received signal includes the string "se1d", the first processor 311 may determine that the first recovery ready signal is received.

In response to receiving the first recovery ready signal, e.g., the first recovery ready signal is received, the second recovery ready signal may be transmitted based on the first internal path IP1 and the fourth internal path IP4 (S253).

Figure 11:
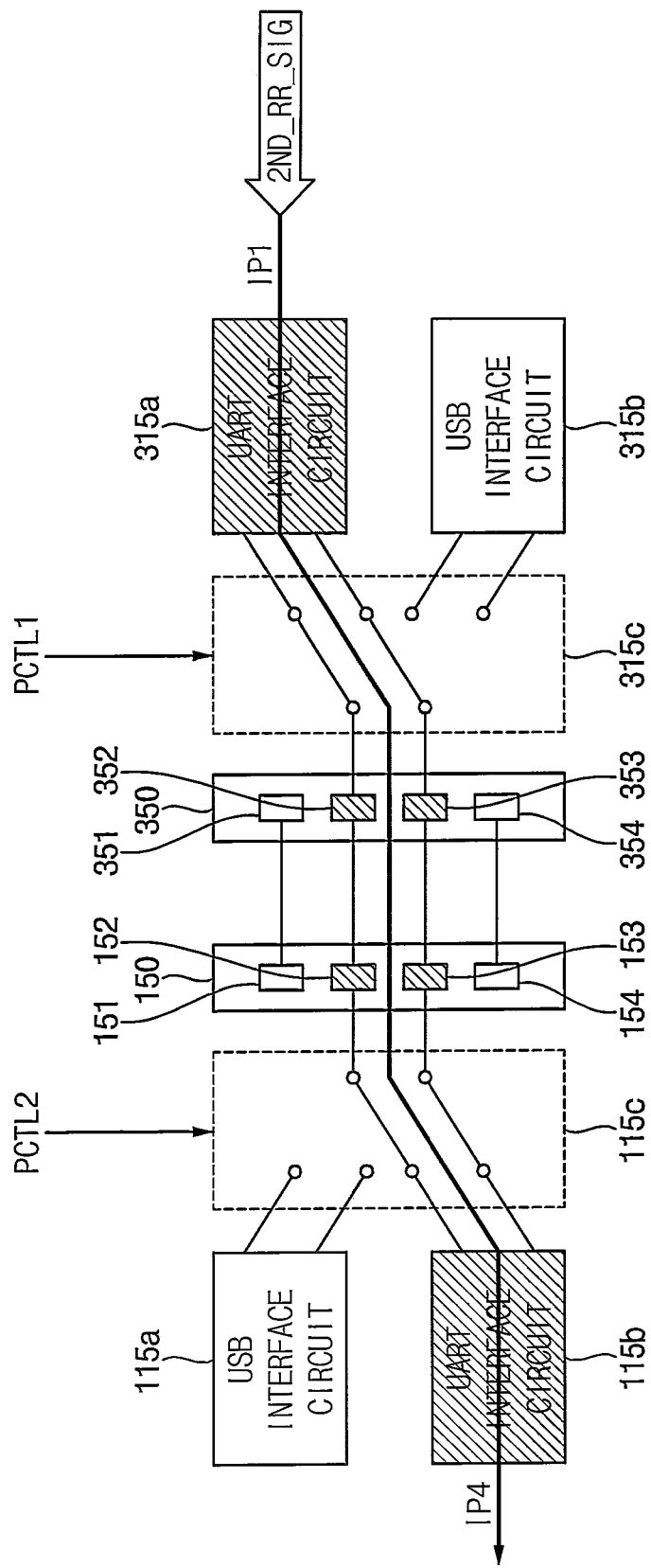
FIG. 11 is a diagram for describing a process of transmitting the second recovery ready signal in FIG. 7.

FIG. 11 is a diagram for describing a process of transmitting the second recovery ready signal in FIG. 7.

Referring to FIGS. 1, 2, 3, 7 and 11, in transmitting the second recovery ready signal 2ND_RR_SIG, the first path selection circuit 315c may connect the second and third pins 352 and 353 of the first connector 350 with the first communication interface circuit 315a, and the second path selection circuit 115c may connect the sixth and seventh pins 152 and 153 of the second connector 150 with the fourth communication interface circuit 115b.

Accordingly, the second recovery ready signal 2ND_RR_SIG may be transmitted from the bridge board 300 to the mobile electronic device 100 through the first internal path IP1, the first communication interface circuit 315a, the fourth communication interface circuit 115b and the fourth internal path IP4 sequentially.

In some example embodiments, since the second recovery ready signal 2ND_RR_SIG is transmitted through the fourth communication interface circuit 115b, the second recovery ready signal 2ND_RR_SIG may be interpreted according to the first communication scheme performed by the fourth communication interface circuit 115b. As described above with reference to FIGS. 2 and 3, the first communication scheme may be based on the UART communication standard.

Figure 12:
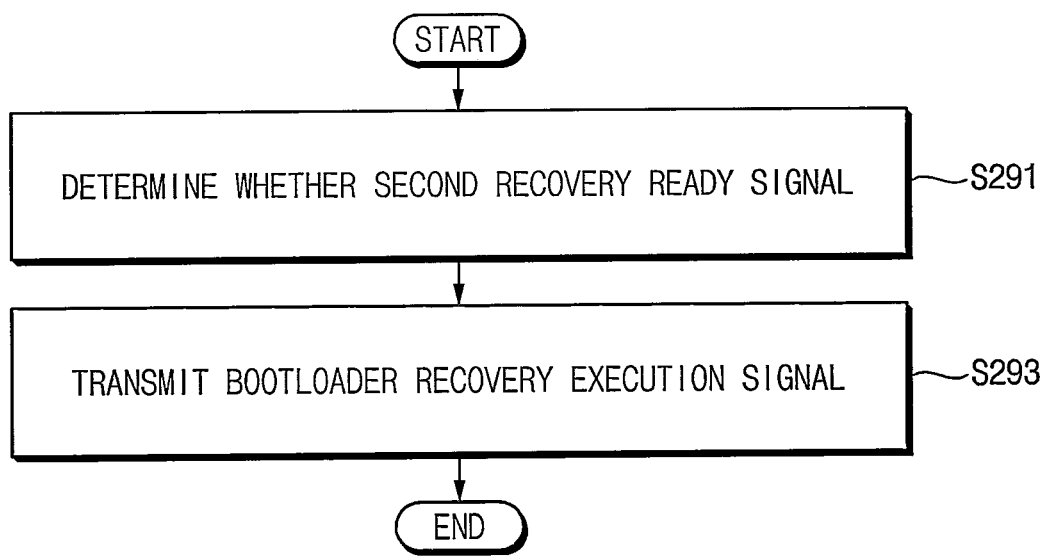
FIG. 12 is a flowchart illustrating example embodiments of transmitting the bootloader recovery execution signal in FIG. 7.

FIG. 12 is a flowchart illustrating example embodiments of transmitting the bootloader recovery execution signal in FIG. 7.

Referring to FIGS. 1, 2, 3, 7 and 12, transmitting the bootloader recovery execution signal may be performed by the mobile electronic device 100.

In the transmitting the bootloader recovery execution signal, it may be determined whether the second recovery ready signal is received (S291).

In some example embodiments, the mobile electronic device 100 may interpret payload data included in signal received from the bridge board 300 to determine whether the second recovery ready signal is received. For example, when the received signal includes the string "se1r", the second processor 111 may determine that the second recovery ready signal is received.

In response to receiving the second recovery ready signal, e.g., the second recovery ready signal is received, the bootloader recovery execution signal may be transmitted based on the first internal path IP1 and the fourth internal path IP4 (S293).

Figure 13:
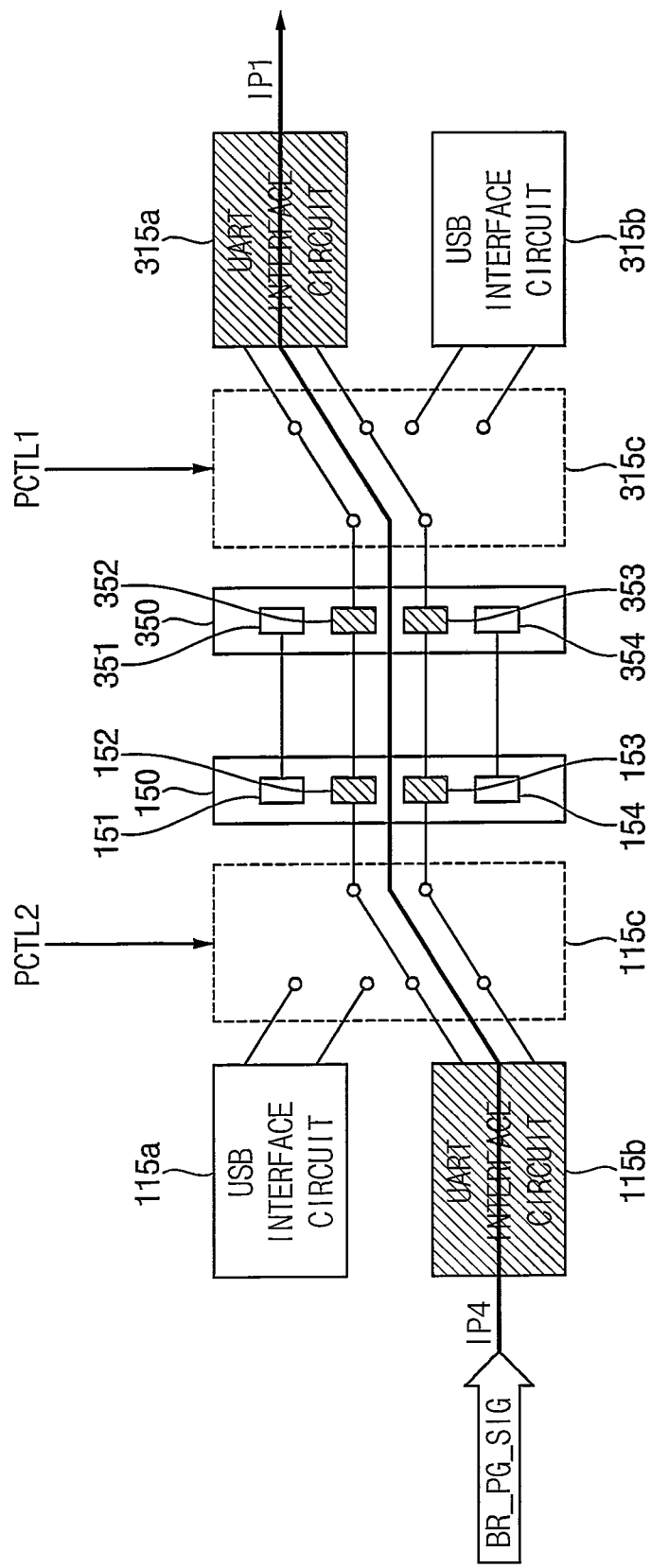
FIG. 13 is a diagram for describing a process of transmitting the bootloader recovery execution signal in FIG. 7.

FIG. 13 is a diagram for describing a process of transmitting the bootloader recovery execution signal in FIG. 7.

Referring to FIGS. 1, 2, 7 and 13, in transmitting a bootloader recovery execution signal BR_PG_SIG, the first path selection circuit 315c may connect the second and third pins 352 and 353 of the first connector 350 with the first communication interface circuit 315a, and the second path selection circuit 115c may connect the sixth and seventh pins 152 and 153 of the second connector 150 with the fourth communication interface circuit 115b.

Accordingly, the bootloader recovery execution signal BR_PG_SIG may be transmitted from the mobile electronic device 100 to the bridge board 300 through the fourth internal path IP4, the fourth communication interface circuit 115b, the first communication interface circuit 315a and the first internal path IP1 sequentially.

In some example embodiments, since the bootloader recovery execution signal BR_PG_SIG is transmitted through the first communication interface circuit 315a, the bootloader recovery execution signal BR_PG_SIG may be interpreted according to the first communication scheme performed by the first communication interface circuit 315a. As described above with reference to FIGS. 2 and 3, the first communication scheme may be based on the UART communication standard.

Figure 14:
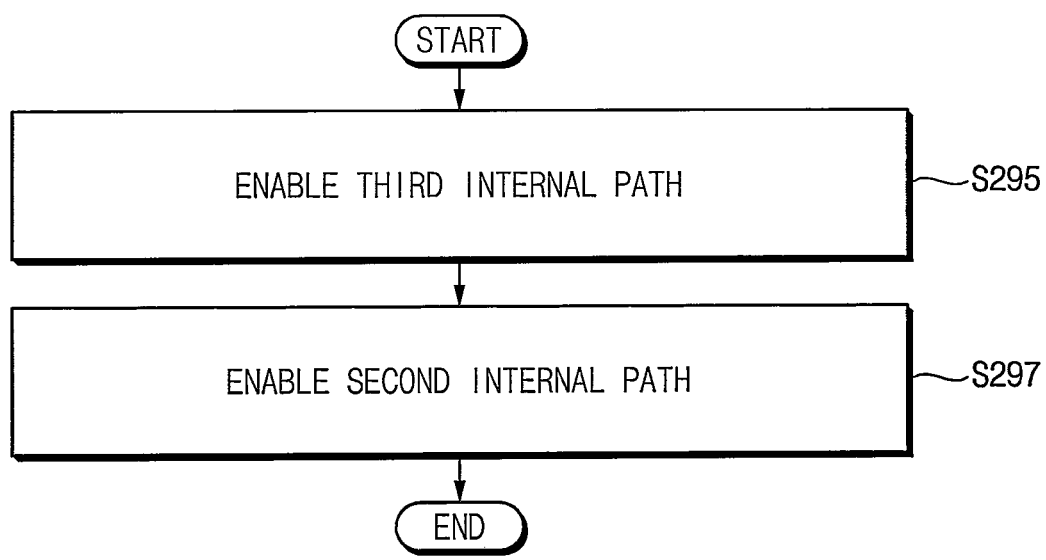
FIG. 14 is a flowchart illustrating example embodiments of transmitting the bootloader recovery execution signal in FIG. 7.

FIG. 14 is a flowchart illustrating example embodiments of transmitting the bootloader recovery execution signal in FIG. 7.

Referring to FIGS. 1, 2, 3, 7 and 14, in the transmitting the bootloader recovery execution signal, after transmitting the bootloader recovery execution signal, the third internal path IP3 of the mobile electronic device 100 may be enabled (S295). The enabling the third internal path IP3 may be performed by the mobile electronic device 100.

In some example embodiments, the second path selection circuit 115c may connect the sixth and seventh pins 152 and 153 to the third communication interface circuit 115a based on the second control signal PCTL2 to enable the third internal path IP3 and disable the fourth internal path IP4.

After receiving the bootloader recovery execution signal, the second internal path IP2 of the bridge board 300 may be enabled (S297). The enabling the second internal path IP2 may be performed by the bridge board 300.

In some example embodiments, the first path selection circuit 315c may connect the second and third pins 352 and 353 to the second communication interface 315b based on the first control signal PCTL1 to enable the second internal path IP2 and disable the first internal path IP1.

Figure 15:
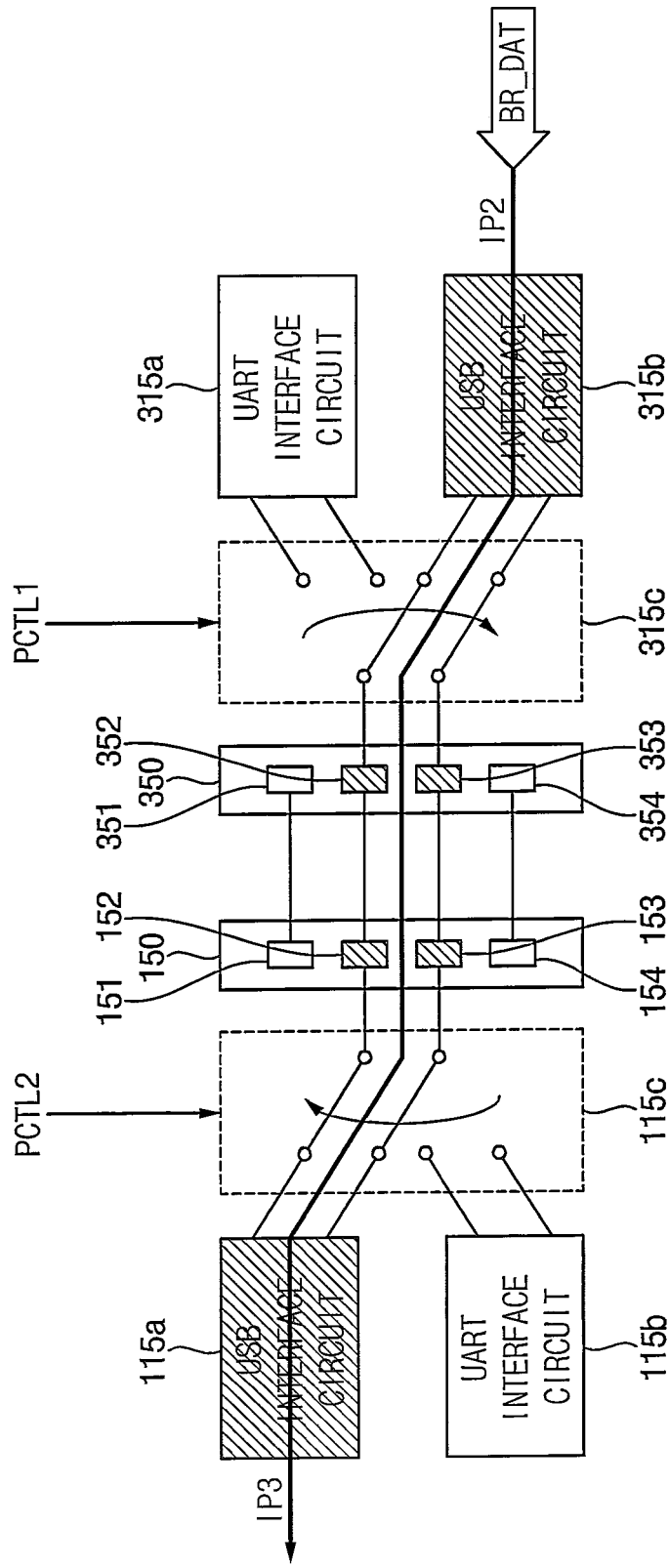
FIG. 15 is a diagram for describing a process of transmitting the bootloader recovery data in FIG. 1.

FIG. 15 is a diagram for describing a process of transmitting the bootloader recovery data in FIG. 1.

Referring to FIGS. 1, 2, 3 and 15, in transmitting a bootloader recovery data BR_DAT, the first path selection circuit 315c may connect the second and third pins 352 and 353 of the first connector 350 with the second communication interface circuit 315b, and the second path selection circuit 115c may connect the sixth and seventh pins 152 and 153 of the second connector 150 with the third communication interface circuit 115a.

Accordingly, the bootloader recovery data BR_DAT may be transmitted to the bridge board 300 through the second internal path IP2, the second communication interface circuit 315b, the third communication interface circuit 115a and the third internal path IP3 sequentially.

In some example embodiments, since the bootloader recovery data BR_DAT is transmitted through the third communication interface circuit 115a, the bootloader recovery data BR_DAT may be interpreted according to the second communication scheme performed by the third communication interface circuit 115a. As described above with reference to FIGS. 2 and 3, the second communication scheme may be based on the USB communication standard.

Figure 16:
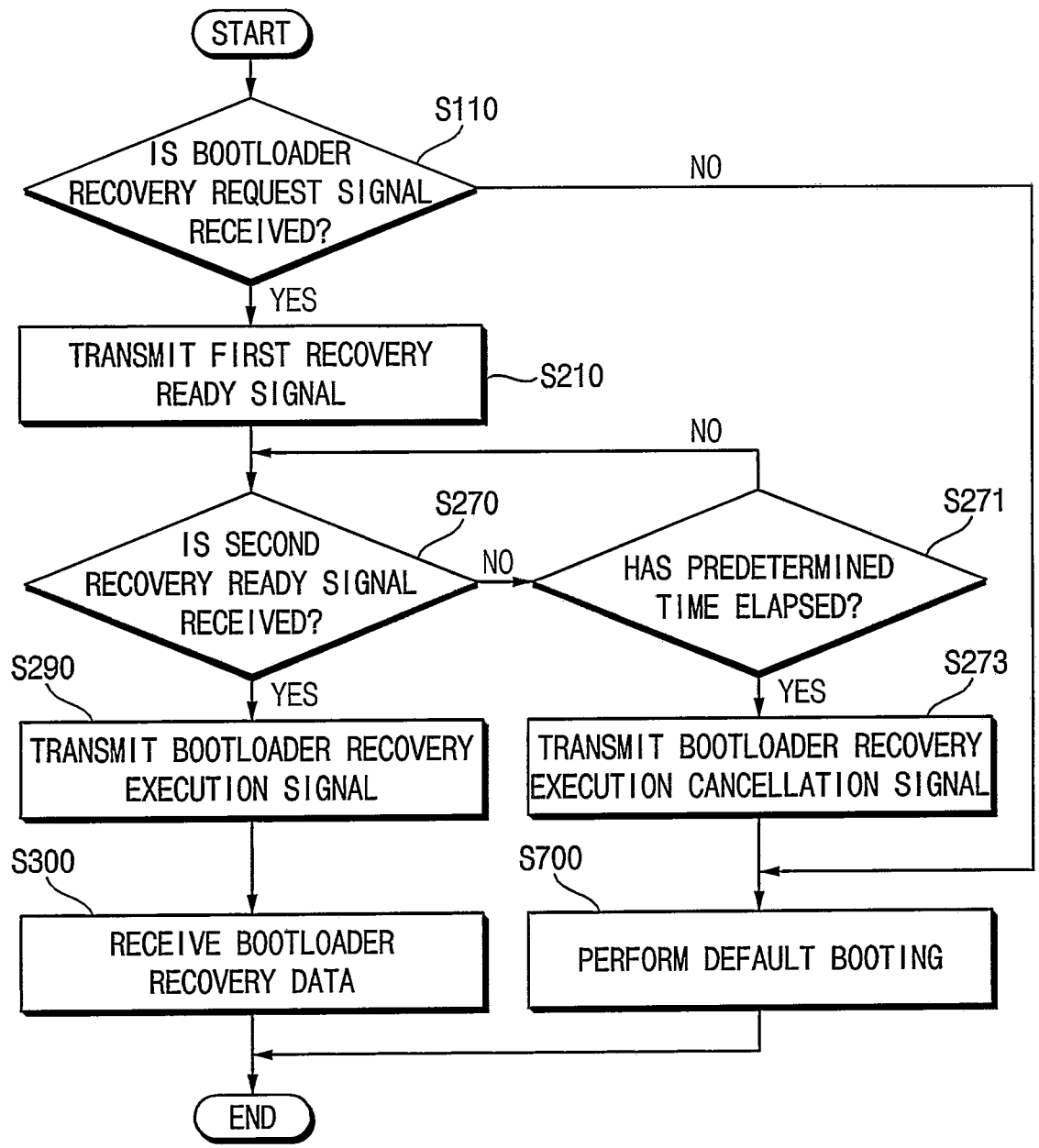
FIG. 16 is a flowchart illustrating a method of recovering a bootloader in a mobile electronic device according to example embodiments.

FIG. 16 is a flowchart illustrating a method of recovering a bootloader in a mobile electronic device according to example embodiments.

In FIG. 16, a method of recovering a bootloader in a mobile electronic device may be performed by a bootloader recovery system in which a bridge board is electrically connected between the mobile electronic device and a host device. However, for convenience of description, only operations performed by the mobile electronic device will be described.

Referring to FIGS. 1, 7 and 16, operations having the same reference numerals may have the same or similar functions.

In the method of recovering the bootloader in the mobile electronic device, the mobile electronic device may determine whether the bootloader recovery request signal is received (S110).

In some example embodiments, the transmitting the bootloader recovery request signal from the bridge board to the mobile electronic device described above with reference to FIG. 1 may be performed before S110.

In response to receiving the bootloader recovery request signal (S110: YES), a first recovery ready signal may be transmitted from the mobile electronic device to the bridge board based on the first internal path and the fourth internal path (S210).

Although not illustrated in detail, when the first recovery ready signal is received, the bridge board may transmit a second recovery ready signal to the mobile electronic device based on the first internal path and the fourth internal path.

In response to receiving the second recovery ready signal (S270: YES), the mobile electronic device may transmit bootloader recovery data to the bridge board based on the first internal path and the fourth internal path (S290). The host device may transmit the bootloader recovery data to the bridge board, the bridge board may transmit the bootloader recovery data to the mobile electronic device based on the second internal path and the third internal path, and the mobile electronic device may receive the bootloader recovery data (S300).

In response to non-receiving the second recovery ready signal (S270: NO), the mobile electronic device may determine whether a predetermined or alternatively, desired time interval is elapsed from a first time point. In some example embodiments, the first time point may represent a time point at which the first recovery ready signal is transmitted from the mobile electronic device to the bridge board.

In response to being the predetermined or alternatively, desired time interval from the first time point (S271: YES), the mobile electronic device may transmit a bootloader recovery execution cancellation signal from the mobile electronic device to the bridge board based on the first internal path and the fourth internal path (S273). The mobile electronic device may perform a default booting (S700).

In some example embodiments, the bootloader recovery execution cancellation signal may include a "to" string as payload data.

In some example embodiments, the predetermined or alternatively, desired time internal in S270 may be '100 ms'.

The mobile electronic device may re-determine whether the second recovery ready signal is received (S270) within the predetermined or alternatively, desired time interval from the first time point (S271: NO).

Figure 17:
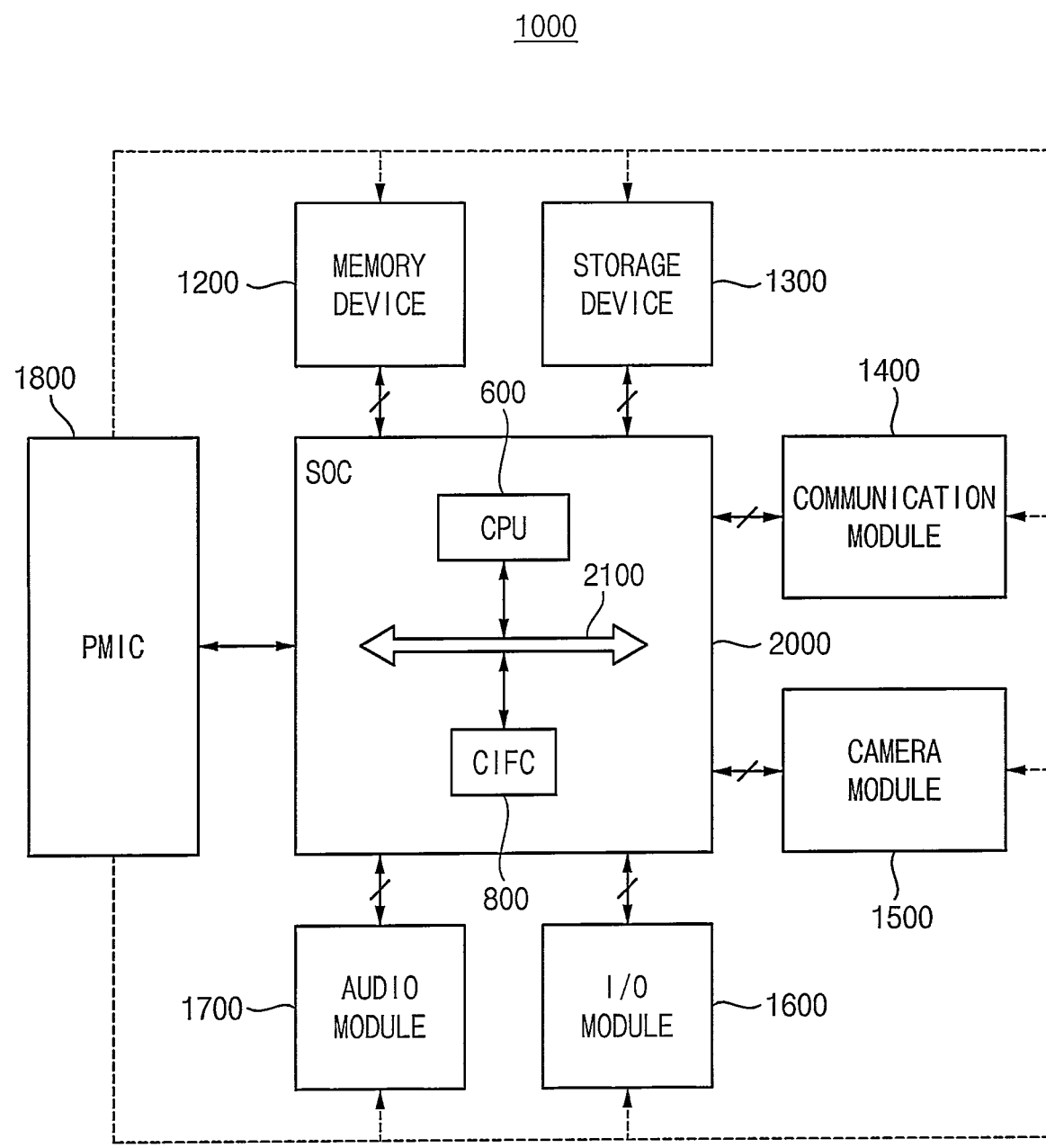
FIG. 17 is a block diagram illustrating example embodiments of the mobile electronic device in the bootloader recovery system of FIG. 2.

FIG. 17 is a block diagram illustrating example embodiments of the mobile electronic device in the bootloader recovery system of FIG. 2.

Referring to FIG. 17, a mobile electronic device 1000 may include a SOC 2000, a memory device 1200, a storage device 1300, a plurality of functional modules 1400, 1500, 1600 and 1700, and/or a power management integrated circuit (PMIC) 1800.

The SOC 2000 controls overall operations of the mobile electronic device 1000. For example, the SOC 2000 may control the memory device 1200, the storage device 1300 and the plurality of functional modules 1400, 1500, 1600 and 1700. For example, the SOC 2000 may be an application processor (AP).

The SOC 2000 may include a system bus 2100, a host processor (CPU) 600 and a communication interface circuit (CIFC) 800.

In some example embodiments, the communication interface circuit 800 may correspond to the second connector 150 and the second internal path selector 113 or the second connector 150 and the second interface circuit 115 described above with reference to FIG. 3. Accordingly, the communication interface circuit 800 may communicate with an external device and/or a bridge board. For example, the communication interface circuit 800 may perform the method of recovering the bootloader in the mobile electronic device according to example embodiments.

The host processor 600 may be electrically connected to the system bus 2100 and may control overall operations of the SOC 2000. For example, the host processor 600 may include a central processing unit (CPU) or at least one of various processors.

The memory device 1200 and the storage device 1300 may store the bootloader, instructions, data, etc. necessary for operations of the mobile electronic device 1000. The memory device 1200 may include a volatile memory device, such as a dynamic random access memory (DRAM), a static random access memory (SRAM), a mobile DRAM, etc. The storage device 1300 may include a nonvolatile memory device, such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc. In some example embodiments, the storage device 1300 may further include an embedded multimedia card (eMMC), a universal flash storage (UFS), a solid state drive (SSD), a hard disk drive (HDD), a CD-ROM, etc.

The functional modules 1400, 1500, 1600 and 1700 may perform various functions of the mobile electronic device 1000. For example, the mobile electronic device 1000 may include a communication module 1400 that performs a communication function (e.g., a code division multiple access (CDMA) module, a long term evolution (LTE) module, a radio frequency (RF) module, an ultra-wideband (UWB) module, a wireless local area network (WLAN) module, a worldwide interoperability for a microwave access (WIMAX) module, etc.), a camera module 1500 that performs a camera function, an input-output (I/O) module 1600 including a display module that performs a display function and a touch panel module that performs a touch sensing function, and an audio module 1700 including a microphone (MIC) module, a speaker module, etc. that performs input-output of audio signals. In some example embodiments, the mobile electronic device 1000 may further include a global positioning system (GPS) module, a gyroscope module, etc. However, the functional modules 1400, 1500, 1600 and 1700 in the mobile electronic device 1000 are not limited thereto.

The PMIC 1800 may provide an operating voltage to the SOC 2000, the memory device 1200, the storage device 1300 and the functional modules 1400, 1500, 1600 and 1700.

The mobile electronic device 1000 may be a device, such as a desktop computer, a laptop computer, a cellular phone, a smart phone, an MP3 player, a personal digital assistant (PDA), a portable multimedia player (PMP), a digital television, a digital camera, a server computer, a workstation, a set-top box, a portable game console, a navigation system, a wearable device, an internet of things (IoT) device, an internet of everything (IoE) device, an e-book, a virtual reality (VR) device, an augmented reality (AR) device, a drone, etc. The mobile electronic device 1000 may typically be operated in response to direct user input, but may also be used to communicate with other devices via the Internet or other network systems.

As described above, in the method of recovering the bootloader in the mobile electronic device according to example embodiments, the bootloader having an error may be recovered without disassembling the mobile electronic device. Accordingly, the efficiency of the development process may be easily improved without impairing the waterproof and/or dustproof capabilities of the mobile electronic device by executing the method of recovering the bootloader.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The example embodiments may be usefully used in the mobile electronic device in which a booting process is performed by the bootloader. The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of recovering a bootloader in a mobile electronic device, the method comprising:
   receiving, by the mobile electronic device including a third internal path and a fourth internal path, a bootloader recovery request signal through the third internal path;
   when the bootloader recovery request signal is received, changing, by the mobile electronic device, a boot mode of the mobile electronic device through the fourth internal path;
   when the boot mode is changed, receiving, by the mobile electronic device, bootloader recovery data through the third internal path; and
   recovering, by the mobile electronic device, the bootloader based on the bootloader recovery data,
   wherein the fourth internal path is configured to operate based on a first communication scheme, and the third internal path is configured to operate based on a second communication scheme different from the first communication scheme.

2. The method of claim 1, wherein changing the boot mode includes:
   outputting a first recovery ready signal through the fourth internal path;
   receiving a second recovery ready signal through the fourth internal path; and
   outputting a bootloader recovery execution signal through the fourth internal path.

3. The method of claim 2, wherein outputting the first recovery ready signal includes:
   determining whether the bootloader recovery request signal is received;
   when it is determined that the bootloader recovery request signal is received, enabling the fourth internal path; and
   transmitting the first recovery ready signal from the mobile electronic device to a bridge board through the enabled fourth internal path, the bridge board being located outside the mobile electronic device.

4. The method of claim 3, wherein outputting the first recovery ready signal further includes:
   when it is determined that the bootloader recovery request signal is received, disabling the third internal path.

5. The method of claim 3, wherein receiving the second recovery ready signal includes:
   determining whether the first recovery ready signal is received; and
   when it is determined that the first recovery ready signal is received, transmitting the second recovery ready signal from the bridge board to the mobile electronic device through the enabled fourth internal path.

6. The method of claim 3, wherein outputting the bootloader recovery execution signal includes:
   determining whether the second recovery ready signal is received; and
   when it is determined that the second recovery ready signal is received, transmitting the bootloader recovery execution signal from the mobile electronic device to the bridge board through the enabled fourth internal path.

7. The method of claim 6, further comprising:
   when the second recovery ready signal is not received, determining whether a predetermined time interval is elapsed from a first time point representing a time point at which the first recovery ready signal is received; and
   when it is determined that the predetermined time interval is elapsed from the first time point, outputting a bootloader recovery execution cancellation signal through the fourth internal path.

8. The method of claim 7, further comprising:
re-determining whether the second recovery ready signal is received within the predetermined time interval from the first time point.

9. The method of claim 1, wherein:
a first recovery ready signal, a second recovery ready signal and a bootloader recovery execution signal are transmitted based on the first communication scheme.

10. The method of claim 1, wherein:
the bootloader recovery data is transmitted based on the second communication scheme.

11. The method of claim 1, wherein:
the first communication scheme is based on an universal asynchronous receiver transmitter (UART) communication standard, and
the second communication scheme is based on an universal serial bus (USB) communication standard.

12. The method of claim 2, wherein changing the boot mode further includes:
activating the third internal path after the bootloader recovery execution signal is output.

13. The method of claim 1, further comprising:
when the bootloader recovery request signal is not received, performing a default booting.

14. A mobile electronic device comprising:
a processor;
third and fourth internal paths; and
an internal path selector configured to select one of the third and fourth internal paths under a control of the processor,
wherein the mobile electronic device is configured to,
receive a bootloader recovery request signal through the third internal path;
when the bootloader recovery request signal is received, change a boot mode of the mobile electronic device through the fourth internal path;
when the boot mode is changed, receive bootloader recovery data through the third internal path; and
recover the bootloader based on the bootloader recovery data,
wherein the fourth internal path is configured to operate based on a first communication scheme, and the third internal path is configured to operate based on a second communication scheme different from the first communication scheme.

15. The mobile electronic device of claim 14, wherein the mobile electronic device is configured to receive the bootloader recovery request signal and the bootloader recovery data from a bridge board located outside the mobile electronic device.

16. The mobile electronic device of claim 15, wherein:
the bridge board includes first and second internal paths,
the bootloader recovery request signal is transmitted through the first internal path of the bridge board and the third internal path of the mobile electronic device, and
the bootloader recovery data is transmitted through the second internal path of the bridge board and the third internal path of the mobile electronic device.

17. The mobile electronic device of claim 16, wherein:
the first internal path is configured to operate based on the first communication scheme,
the second internal path is configured to operate based on the second communication scheme,
the first communication scheme is based on an universal asynchronous receiver transmitter (UART) communication standard, and
the second communication scheme is based on an universal serial bus (USB) communication standard.

18. The mobile electronic device of claim 16, wherein:
the mobile electronic device includes a first connector,
the bridge board includes a second connector,
the mobile electronic device and the bridge board are connected to each other through the first connector and the second connector,
each of the first connector and the second connector includes a first pin and a second pin, and
the bootloader recovery request signal is generated by setting a voltage level of the first pin and the second pin to a logic high level.

19. The mobile electronic device of claim 14, wherein the mobile electronic device is configured to:
output a first recovery ready signal through the fourth internal path;
receive a second recovery ready signal through the fourth internal path; and
output a bootloader recovery execution signal through the fourth internal path.

20. The mobile electronic device of claim 19, wherein:
the first recovery ready signal, the second recovery ready signal and the bootloader recovery execution signal are transmitted between the mobile electronic device and a bridge board located outside the mobile electronic device,
the bridge board includes first and second internal paths,
the first recovery ready signal is transmitted through the fourth internal path of the mobile electronic device and the first internal path of the bridge board,
the second recovery ready signal is transmitted through the first internal path of the bridge board and the fourth internal path of the mobile electronic device, and
the bootloader recovery execution signal is transmitted through the fourth internal path of the mobile electronic device and the first internal path of the bridge board.

* * * * *